United States Patent [19]

Liebscher et al.

[11] 4,108,082

[45] Aug. 22, 1978

[54] CONTAINER LOCKING DEVICE

[75] Inventors: Güenther Liebscher, Wiesbaden-Kohlheck; Güenter Christ, Geisenheim Rhg, both of Fed. Rep. of Germany

[73] Assignee: Lermer Apparatebau GmbH, Wiesbaden, Fed. Rep. of Germany

[21] Appl. No.: 746,434

[22] Filed: Dec. 1, 1976

[30] Foreign Application Priority Data

Sep. 21, 1976 [DE] Fed. Rep. of Germany ....... 7629359

[51] Int. Cl.² .......... B60P 7/08; B61D 45/00; B64D 9/00; B65J 1/22
[52] U.S. Cl. .............. 105/464; 105/336 B; 244/118 R; 248/119 S
[58] Field of Search ............... 105/366 R, 368 S, 463, 105/464, 336 B, 366 C; 244/118 R, 118 P; 248/119 R, 119 S; 280/179 R; 214/10.5 R, 516, 517, 518

[56] References Cited

U.S. PATENT DOCUMENTS

| 2,703,659 | 3/1955 | Hutchins | 105/366 R X |
| 3,143,083 | 8/1964 | Gutridge et al. | 105/368 S |
| 3,159,111 | 12/1964 | Gutridge et al. | 105/366 R |

Primary Examiner—Drayton E. Hoffman
Assistant Examiner—Howard Beltran
Attorney, Agent, or Firm—W. G. Fasse; W. W. Roberts

[57] ABSTRACT

A locking device for transport containers or trolleys as used on aircrafts or generally in transportation, includes an anchoring mushroom on the freight floor. A locking lever with a nose engages the mushroom. The locking lever is journalled in a lock housing secured to the bottom of the container or trolley and held in locking position by two springs and by gravity due to a rotatable connection between the locking lever and an actuating lever which is also journalled at the bottom of the container or trolley. The levers can be released from their locked position by the actuation, for example, of a foot pedal.

8 Claims, 3 Drawing Figures

CONTAINER LOCKING DEVICE

BACKGROUND OF THE INVENTION

The invention relates to a locking device for transport containers or trolleys, especially as they are used in aviation, whereby the locking of the container or container supporting trolley to the freight floor is accomplished by means of an anchoring member, for example, having the shape of a mushroom engaged by a locking mechanism. The anchoring mushroom is secured to the freight floor and the locking mechanism is secured to the container or trolley, preferably in a locking housing which in turn is secured to the bottom plate of the container or trolley.

It is well known to secure containers, which in this context may also be referred to as trolleys, in accordance with international usage, to the freight floor, especially in an aircraft. For this purpose the freight floor of an aircraft, especially of a civil aircraft is provided with anchoring means having a standardized shape similar to a mushroom.

The main disadvantages of such known devices is seen in that the locking mechanism is frequently deficient in that merely one spring assures the locking, whereby the unlocking cannot be avoided, for example, when the spring breaks or where the locking device is subject to heavy shocks.

OBJECTS OF THE INVENTION

In view of the above, it is the aim of the invention to achieve the following objects, singly or in combination:

to provide a locking device for the above described environment, which device is easily locked and unlocked while simultaneously assuring sufficient safety against unintentional unlocking;

to arrange a locking lever and an actuation lever in such a manner that their cooperating ends are biased downwardly into a locking position, not only by two separate springs, but also by gravity;

to arrange two sets of locking elements in mirrorsymmetrical fashion relative to each other whereby an anchoring member may be engaged substantially on two opposite sides by the respective anchoring levers or locking levers; and to arrange the actuating lever or levers for easy access.

SUMMARY OF THE INVENTION

According to the invention there is provided a locking mechanism for a transport container or trolley in which a locking lever is journalled in seesaw fashion in such a position that upon moving the container or trolley into the locking position an anchoring member lifts the locking lever until the locking position is reached in which the free end of the locking lever engages the top of the anchor as well as a side thereof. An actuating lever is also journalled so that one of its ends is free for actuation whereas the opposite end is operatively connected with the locking lever. The actuating lever is preferably arranged so that its arms form an angle and slant downwardly. The interconnection between the two levers is through longitudinal holes, one arranged in the end of the actuating lever, the other arranged in a connecting member secured to the locking lever. A bolt extends through the two longitudinal holes. The journal axis for at least one of the levers, preferably of both levers, is selected so that the ends of the levers adjacent to the anchoring means are biased downwardly by gravity. Further, at least two springs are provided which also bias the two levers downwardly.

It is an important advantage of the invention that the two springs operate independently of each other and that each spring biases both levers into the locking position. This double spring action is enhanced by the fact that at least one, preferably both levers, are so journalled that gravity will tend to keep the levers in the locking position, thus supporting the action of the springs.

BRIEF FIGURE DESCRIPTION

In order that the invention may be clearly understood, it will now be described, by way of example, with reference to the accompanyings drawings, wherein.

DETAILED DESCRIPTION OF PREFERRED EXAMPLE EMBODIMENTS

Figure 1:
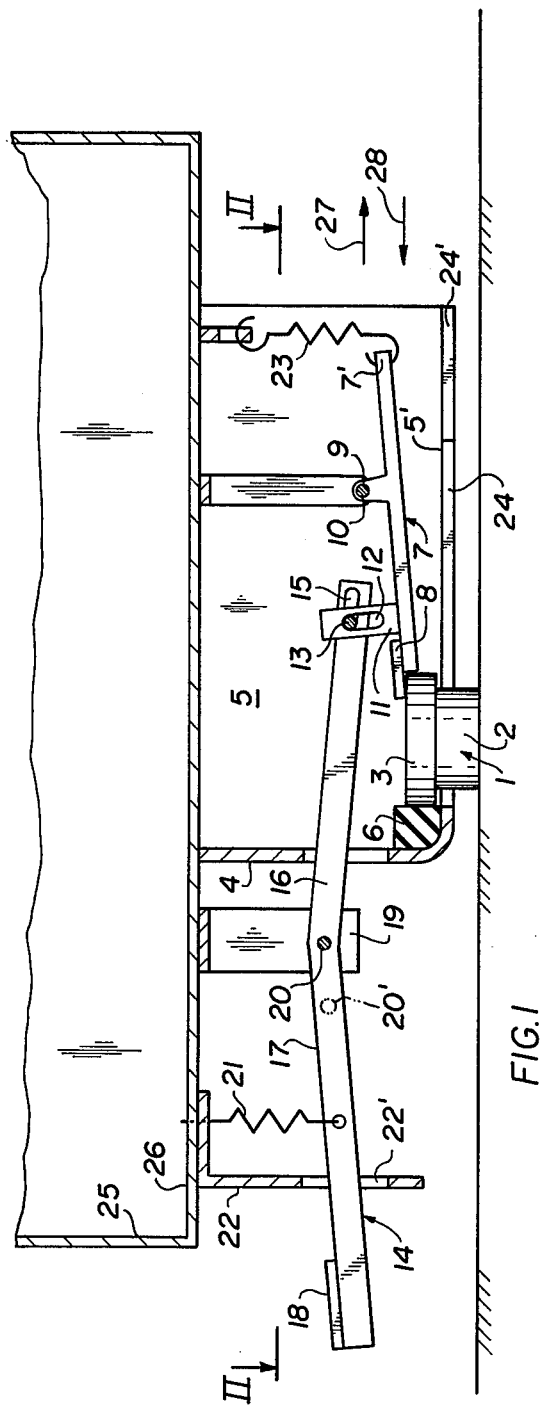
FIG. 1 is a side view partially in section of a locking mechanism according to the invention and as viewed in the direction of arrows I — I in FIG. 2, whereby the locking lever is shown in the locking position whereas the actuating lever is shown in an intermediate position ready to unlock the locking lever.

The locking member 1, preferably in the form of a mushroom, is rigidly attached to the freight floor, for example, of the loading space in an aircraft. A trolley or cart 25 may be guided along the lower part or stem 2 of the anchoring mushroom 1 when the trolley is moved in the direction of the arrow 27, whereby the step 2 engages a guide slot 24. The trolley is moved to the right until the top 3 of the anchor mushroom 1 engages a stop member 6 held in position by a downwardly extending wall 4 forming part of a lock housing 5. The rubber elastic stop member 6 facilitates the careful handling of the freight, however, it is not absolutely necessary. The top 3 of the mushroom 1 also forms a stop for the free locking end 8 of the locking lever 7 which is journalled with an axis 10 through a bushing 9 in the lock housing 5. The locking lever 7 has a first end forming the locking latch or nose 8 and a second end 7' engaged by a biasing spring 23. This spring supports the tendency of the locking lever 7 to keep its locking end 8 in the downward position. When the trolley 25 moves in the direction of the arrow 27, the top of the mushroom 3 lifts the end 8 of the lever 7 by rotating the latter in the clockwise direction until the locking position is reached, whereby the latch 8 snaps into the shown position, thereby locking the trolley in place.

Figure 2:
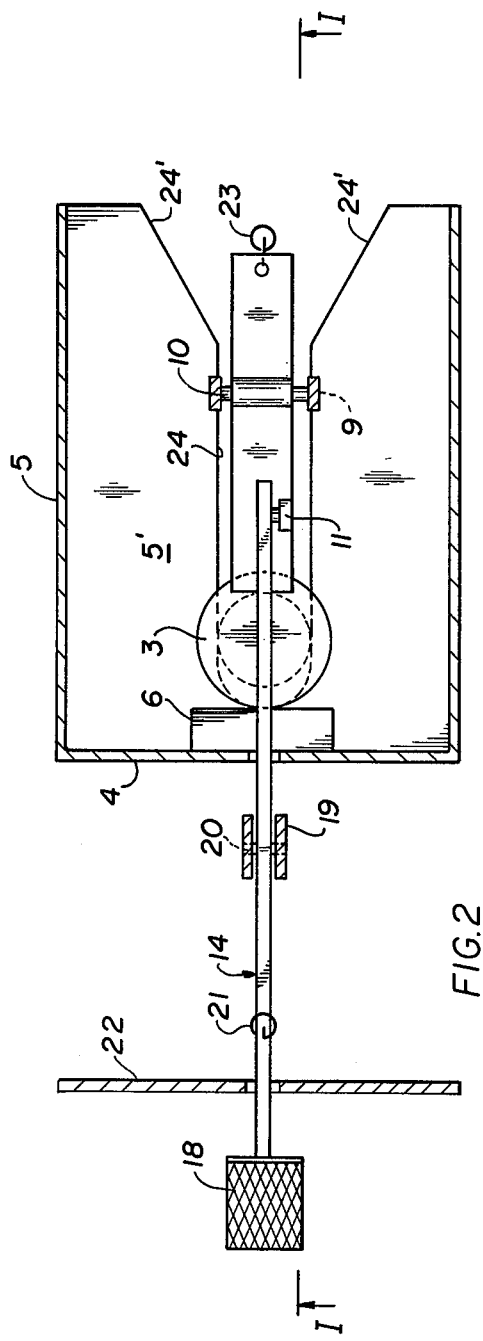
FIG. 2 is a sectional view along the section line II — II in FIG. 1.

A bearing member 11 with a longitudinal hole 12 is attached to the locking lever 7, preferably adjacent to the first mentioned end or nose 8 thereof. A bolt 13 reaches into the longitudinal hole 12 and into a further longitudinal hole 15 in the first end of an actuating lever 14. The bearing or holding member 11 may comprise two spaced plates or it may be slotted for better guiding the arm 16 of the actuating lever 14. However, just one plate as shown in FIG. 2 is also suitable for interconnecting the two first lever ends. In any event, the bolt 13 is so guided that it is freely movable relative to the holding member 11 and relative to the lever arm 16 in the longitudinal holes 12 and 15 which extend substantially at right angles relative to each other. In the position shown the actuating lever 14 is in an intermediate position ready to lift the locking lever 7 out of the locking position. Normally, the bolt 13 would be in contact with the lower end of the longitudinal hole 12 due to the bias of the spring 21 and due to the effect of gravity on the first end of the actuating lever 14.

The actuating lever 14 is journalled on a bearing or support bracket 19 by a journal axle 20 in seesaw fashion in the same manner as the locking lever 7. Preferably, the bolt 20 would extend through a hole 20' in the lever arm 17 of the actuating lever 14 in off-center fashion so as to keep the right hand or first end of the actuating lever in a downward position under the influence of gravity which also contributes to preventing an undesired release of the locking mechanism. The two arms 16 and 17 of the actuating lever 14 preferably form an angle with each other so that both arms are inclined downwardly. The spring 21 biases the arm 16 in a clockwise direction and the lever 7 in a counterclockwise locking direction through the bolt 13 which connects the first ends of the actuating lever end of the locking lever to each other through the longitudinal holes 12 and 15 and through the holding or connecting member 11. The downward bias of the lever 17 by the arm 16 and the spring 21 is present even in the released position. The second end of the lever 14 is provided with a foot pedal 18 and as shown the lever 14 is in an intermediate position ready to unlock the lever 7, because in the normal, downward position the bolt 13 would engage the lower end of the longitudinal hole 12.

Normally, the two inclined lever arms 16 and 17 would be welded to each other and the welding joint may be mechanically weaker. This is another reason why it would be advantageous to place the journal axes 20 through the hole 20', whereby the support bracket 19 would be correspondingly shifted somewhat to the left to provide for the above mentioned fact that the arm 16 should be heavier than the arm 17. The combination of the heavier weight of the arm 16 of the actuating lever 14 on the side of the locking lever 7 with the spring 21, biases the arm 17 with the foot pedal 18 in a clockwise direction toward the container floor 26. This arrangement provides an additional security against unwanted unlocking of the trolley 25 which otherwise might occur in case of shocks or the like.

To prevent the arm 17 with the foot pedal 18 from being bent sideways, a wall 22 with a guide slot 22' is mounted to the bottom 26 of the trolley or container 25. This slot 22' provides a secure guide for the arm 17. The locking of the trolley 25 to the mushroom anchor 1 is further secured by a spring 23 which pulls the second or free end 7' of the locking lever 7 in a counterclockwise direction upwardly against the bottom 26 of the trolley. Thus, the locking is assured even in case one of the springs 21 or 23 should break or become disengaged.

The locking mechanism of the invention operates as follows. When the trolley 25 is moved to the right in FIG. 1 in the direction of the arrow 27, the guide edges 24' of the guide slot 24 will facilitate the engagement between the slot 24 and the stem 2 of the mushroom 1. The slot 24 and guide edges 24' are provided in the bottom 5' of the lock housing 5. To provide for this proper engagement between the guide channel 24 and the stem 2, the bottom 5' of the housing 5 is at a level below the top 3 of the anchor mushroom 1.

As the top 3 of the mushroom 1 contacts the bottom of the locking lever 7, it pivots the lever 7 clockwise until the trolley reaches the locking position, wherein the top 3 contacts the elastic stop 6, at this time the lever 7 is rocked counterclockwise by the combined action of gravity and of the two springs 21, 23, whereby the nose or latch 8 prevents the locking lever 7 from going down too far and fixes the locked position relative to the anchor mushroom 1. At the same time the mushroom top 3 keeps in contact with the elastic stop 6, whereby the trolley is prevented from moving in any direction, including sideways. It will be appreciated, that the counterstop wall 4 and the elastic stop member 6 may not be required, for example, where the right hand end of the trolley can stop against an upright wall on the cargo floor.

In case the trolley is to be moved again, it is required to step on the foot pedal 18 to move it down. This lowers the lever arm 17 and lifts up the lever arm 16 and the connection through the bolts 13 to the locking lever 7 lifts the latter up and now the trolley 25 can be removed out of the locked position by shifting it in the direction of the arrow 28. As soon as the slot 24, 24' clears the stem 2, the trolley is free to be moved in any direction. The guide edges 24' are best seen in FIG. 2.

Figure 3:
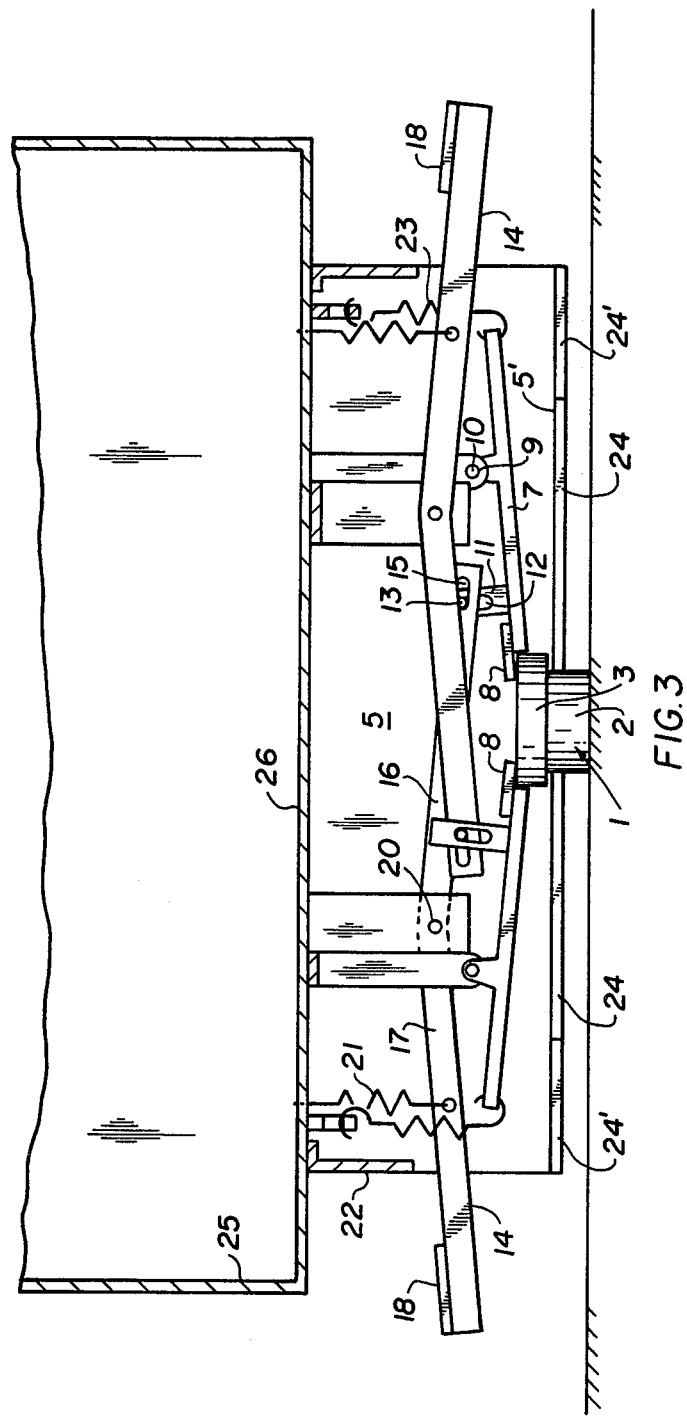
FIG. 3 is a view similar to that of FIG. 1, however, illustrating a modification with two sets of locking and actuating levers arranged in a substantially mirrorsymmetrical fashion relative to each other.

A detailed description of FIG. 3 is unnecessary, suffice it to say, that instead of the stop wall 4 and the stop member 6 in FIG. 1, the arrangement of FIG. 3 provides a second set of locking elements arranged substantially in a mirror-symmetrical fashion relative to the set of locking elements shown in FIG. 1. As shown in FIG. 3, the slot 24 extends lengthwise through the entire bottom 5' and each end of the slot 24 is provided with guide edges 24'. Thus, each end of the slot 24 may approach the mushroom member 1.

The function of both sets of locking elements is the same. Incidentally, the two foot pedals in FIG. 3 could be connected by linking levers so that actuation of any one of the two foot pedals would release both sets of locking elements.

Although the invention has been described with reference to specific example embodiments, it will be appreciated, that it is intended to cover all modification and equivalents within the scope of the appended claims.

What is claimed is:

1. An apparatus for locking a transport trolley to a floor, comprising anchor means rigidly secured to said floor to define a locking position, stop means and guide means secured to the trolley engaging said anchor means when a trolley is moved against said stop means and into said locking position, a set of locking means, securing means for attaching said locking means to said trolley, said set of locking means including locking lever means, and actuating lever means, said locking lever means and said actuating lever means each having first and second ends, said securing means including first and second journal means for respectively supporting said locking lever means and said actuating lever means, said first lever ends extending substantially toward each other, said second lever ends extending substantially in opposite directions, means operatively interconnecting said locking lever means and said actuating lever means, said first lever end of said locking lever means engaging said anchor means in a locking manner in said locking position, and spring means biasing said actuating lever means and said locking lever means in a locking direction to engage said anchor means, said second end of said actuating lever means being operable against the bias of said spring means for shifting said locking lever means out of locking engagement with said anchor means, the first lever end of the locking lever means is also biased by gravity toward said anchor means, and said actuating lever means are journalled intermediate the first and second ends of the actuating lever means so that the first lever end of the actuating lever means is also biased by gravity toward said anchor means, whereby the combined weight of the locking lever means and of the actuating lever means tend to maintain the locking lever means in the locking position.

2. The apparatus according to claim 1, wherein said securing means operatively interconnecting said actuating lever means and said locking lever means comprise a first longitudinal hole in the first end of said actuating lever means, a connector member secured to the locking lever means substantially adjacent to the first end thereof, a second longitudinal hole in said connector member and bolt means operatively extending through said first and second longitudinal holes to movably interconnect said actuating lever means and said locking lever means.

3. The apparatus according to claim 2, wherein said longitudinal holes extend substantially at right angles to each other.

4. The apparatus according to claim 1, wherein said guide means engaging said anchor means are arranged below said locking lever means so that movement of a trolley into the locking position will raise the locking lever means as the latter glide on the anchor means until the locking position is reached.

5. The apparatus according to claim 1, whereing said actuating lever means has two lever arms which are arranged at an angle relative to each other.

6. The apparatus according to claim 5, wherein said two lever arms slant downwardly and wherein the second journal means are arranged in that one lever arm points away from said anchor means.

7. The apparatus according to claim 1, wherein said stop means are arranged at the end of said guide means, said locking lever means holding said anchor means against said stop means in the locking position.

8. The apparatus according to claim 1, wherein said stop means comprises a second set of locking means which constitute with the guide means the stop means that include the same elements as said first mentioned set of locking means, said second set of locking means being arranged substantially mirror-symmetrically to the first mentioned set of locking means, whereby the first ends of the respective locking lever means contact the anchor means substantially on opposite sites in the locking position.

* * * * *